United States Patent
Cortellazzi (10) Patent No.: US 9,308,845 B2
(45) Date of Patent: Apr. 12, 2016

(54) SEAT-COVER AND/OR BACK-COVER STRIPS FOR SEATS OF MOTOR VEHICLES

(76) Inventor: Giovanni Cortellazzi, Colorno (IT)

( * ) Notice: Subject to any disclaimer, the term of this patent is extended or adjusted under 35 U.S.C. 154(b) by 174 days.

(21) Appl. No.: 13/985,139

(22) PCT Filed: Feb. 16, 2012

(86) PCT No.: PCT/IB2012/050718
§ 371 (c)(1),
(2), (4) Date: Aug. 13, 2013

(87) PCT Pub. No.: WO2012/110980
PCT Pub. Date: Aug. 23, 2012

(65) Prior Publication Data
US 2013/0320721 A1 Dec. 5, 2013

(30) Foreign Application Priority Data
Feb. 17, 2011 (IT) .............................. PR2011A0015

(51) Int. Cl.
*B60N 2/60* (2006.01)
*B60N 2/58* (2006.01)
*B60N 2/66* (2006.01)

(52) U.S. Cl.
CPC ............ *B60N 2/5825* (2013.01); *B60N 2/6027* (2013.01); *B60N 2/6063* (2013.01); *B60N 2/66* (2013.01)

(58) Field of Classification Search
USPC ......... 297/219.1, 224, 228.1, 228.13, 230.14, 297/284.5
See application file for complete search history.

(56) References Cited

U.S. PATENT DOCUMENTS

| | | | |
|---|---|---|---|
| 5,147,110 A | 9/1992 | Syers | |
| 5,707,107 A * | 1/1998 | Melone | 297/228.1 |
| 5,906,413 A | 5/1999 | Yang | |
| 6,079,784 A | 6/2000 | Peachey | |
| 6,089,659 A | 7/2000 | Toyota | |
| 6,499,801 B1 * | 12/2002 | Peterson et al. | 297/228.13 |
| 6,655,736 B1 | 12/2003 | Arenas | |
| 6,666,509 B2 * | 12/2003 | Matsushima | 297/219.1 |
| 7,607,732 B2 * | 10/2009 | Beroth et al. | 297/229 |
| 7,938,486 B2 * | 5/2011 | Porat et al. | 297/284.5 |
| 2002/0096919 A1 | 7/2002 | Sparks | |

FOREIGN PATENT DOCUMENTS

WO 02/083453 A1 10/2002

OTHER PUBLICATIONS

Italian Search Report, dated Nov. 9, 2011, from corresponding Italian application.
International Search Report, dated Apr. 24, 2012, from corresponding PCT application.

* cited by examiner

*Primary Examiner* — Sarah McPartlin
(74) *Attorney, Agent, or Firm* — Young & Thompson (57) ABSTRACT

A seat-cover or the back-cover strip for motor-vehicles seats is formed by a band made of a thick but flexible open-work fabric, upper anchoring elements and lower anchoring elements. The strip can include one or more cushions having different shapes and thicknesses, with or without a lining, acting as lumbar and/or spinal supports, fixable on the seat under the band itself. The upper anchoring elements generally include one or more threads for fixing the strip to support bars of a headrest, and at least one rod, having a polygonal cross-section, which cooperates with the one or more threads. The lower anchoring elements include at least one pipe and at least one tape having at least one hook joinable to the free end of a further tape, partially folded on itself and forming a stop for a loop-shaped thread, fixable to the portion under the base of the seats.

14 Claims, 14 Drawing Sheets

SEAT-COVER AND/OR BACK-COVER STRIPS FOR SEATS OF MOTOR VEHICLES

FIELD OF THE INVENTION

The present invention refers to the field of seat-covers for seats of motor-vehicles.

As it is known, generally there are two kinds of seat-covers, the real seat-covers and the mats.

The seat-covers are formed by linings adapted to integrally cover the motor-vehicles seats, in other words they protect not only the back and the base of the seats, but also the sides and the lower portion of the back of the same.

Obviously, these types of seat-covers are not very practical, they cannot be easily and above all quickly replaced.

They have the inconvenient of being not breathable and consequently in the hot weather they increase the heat sensation and therefore also the sweating of the user.

The mats are generally formed by webs made of different materials (for example, straw, synthetic fabric, . . . ), which cover only the front part of the back and base of the motor-vehicles seats.

Said mats have anchoring systems formed by loops made of fabric or rubber bands provided with hooks which fix them to the seat.

It is also apparent that this type of seat-covers has a serious inconvenient: despite the anchoring systems, the seat-cover laterally moves from the initial position because it is pushed by the user.

It is an object of the present invention to eliminate the above mentioned inconvenients by providing a seat-cover and/or back-cover strip of motor-vehicles seats generally formed by:

a band preferably made of an open-work fabric, but also made of (for example leather and/or alcantara), double-twisted yarns, or laminated fabrics or spreaded or quilted fabrics, upper and lower anchoring means capable not only to firmly attach the device to the motor-vehicles seat, but also to apply a tensile stress to the device itself, and, possibly, one or more cushions of different shapes and thicknesses, vertically adjustable according to the type of seat which are applied to and according to the lumbar and/or spinal area of the user.

A first advantage is the greater stability of the device thanks to the tensile stress applied by the upper and lower anchoring means.

Said tensile stress generates a slight pressure adapted to maintain the device in the correct position despite the side movements of the user.

A further advantage is that the seat-cover and/or back-cover strip does not only act as a mat in that it protects the back and base of the seats, but it can also cover only the back of said seats (as shown in the figures).

In both the configurations, that is the one as back-cover and as seat-cover, the strip can act as a support for one or more cushions acting as lumbar and/or spinal supports.

Said cushions can be easily vertically adjusted because they are provided with adhering systems which make them fixable in a non permanent way to the strip, and customizable because it is possible to have different thicknesses as a function of the back type which they will be applied to in order to obtain a correct position of the user. All that makes this device adapted to prevent hurts due to the backbone (back pain, etcetera).

Moreover, since the linings containing said cushions have an anti-slip pattern, the device has a greater stability, especially when the user enters the car.

Another advantage of the device is that it can be easily washed since it is formed by different parts independent one from the other and easily detachable.

Among these advantages, the seat-cover and/or back-cover strip, object of the present invention, can be made of different types of laminated or smeared and/or open-work fabrics, made elastic only in the vertical direction or in the vertical and horizontal directions. Particularly, it is to be noted that the use of this type of vertically elastic fabric makes the cushions located under the strip, more adherent.

Said objects and advantages are all met by the seat-cover and/or back-cover strip of motor-vehicles seats, object of the present invention, which is characterized from what is provided in the attached claims.

This and other characteristics will be better understood by the following description of some embodiments shown in an exemplifying and non-limiting way in the attached drawings.

FIGS. 17 and 18: show the thread of another possible variant of an embodiment and the rod which said thread is engaged with;

FIG. 19: shows the thread of FIG. 17 in another possible variant of an embodiment and the rod which said thread is engaged with;

Referring particularly to the figures, 1 generally shows a seat-cover and/or back-cover strip for seats 100 of motor-vehicles.

Said strip 1 is substantially formed by:
- a band 3 made of a laminated or smeared or quilted fabric, thick but flexible, vertically elastic or vertically and horizontally elastic (for example made of synthetic fibers, or cotton having different percentages of an elastomer) and/or leather and/or alcantara; said fabrics being obtained by crochet looms,
- upper anchoring means 5, and
- lower anchoring means 6.

Further, it can comprise a lumbar and/or spinal cushion 2, fixable on the seat 100 back of the motor-vehicles by a band 3 and under the same. The cushions can be provided with or without a lining.

Said band 3 is positioned at the central area of the seat back 100 of the motor-vehicles when the device acts as a back-cover, at the central area of the back and at the base in case it acts as a complete seat-cover.

Obviously, the strip 1 can show different degrees of trim, in other words it can be edged or hemmed.

The strip 1, object of the present invention, is fixable to the motor-vehicles seats 100 by the above mentioned upper and lower anchoring means 5, 6.

As it is simply shown in FIGS. 20-23, the upper anchoring means 5 comprise:
- one or more threads 7, for example loops made of thread or cables or ropes made of nylon or strings or Cordura (trademark of INVISTA TECHNOLOGIES S.r.l.), for fixing the strip 1 to support bars 11 of a headrest 12 of motor-vehicles seats 100, each having attaching devices 9a, 9b, 9c, some of them engage polygonal hooking apparatuses 28a, 28b, 28c, other directly engage:
- at least one removable rod 8, having a polygonal cross-section, cooperating with the one or more threads 7 directly or by the said hooking apparatuses 28a, 28b, 28c.

Particularly, it is to be noted that said anchoring means 5, and therefore the attaching devices 9a, 9b, 9c and the hooking apparatuses 28a, 28b, 28c in which are engaged, comprise different examples of an embodiment.

Figure 3:
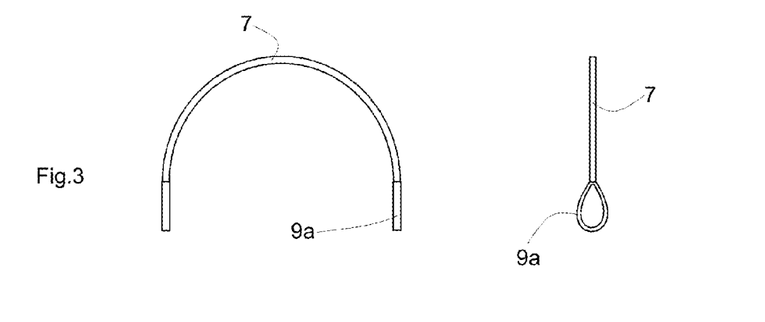
FIG. 3: shows a front and side views of a thread of the upper anchoring means.
Figure 4:
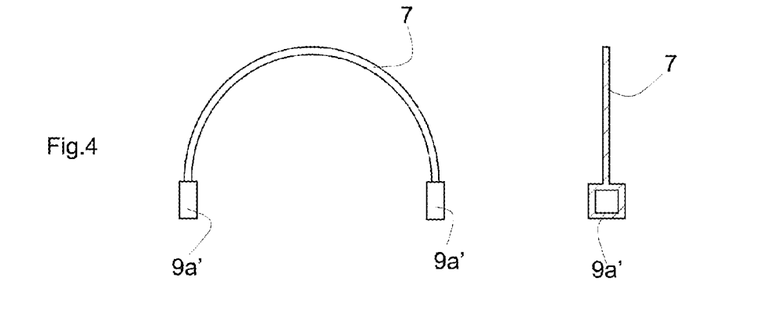
FIG. 4: shows a front and side views of a variation of the thread of FIG. 3.
Figure 5:
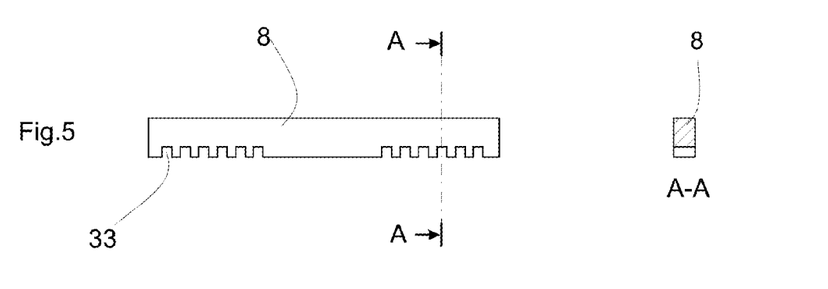
FIG. 5: shows a front and cross-section side view of the rod which is part of the upper anchoring means present in the upper portion of the device.
Figure 6:
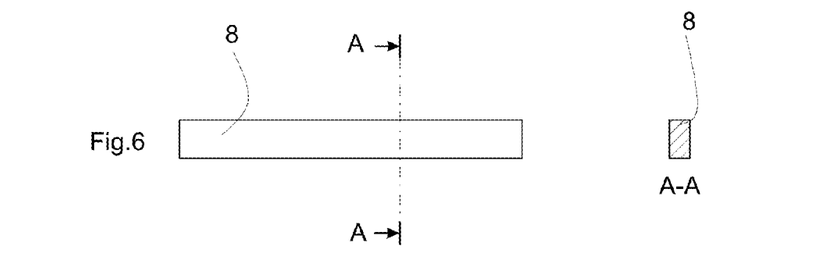
FIG. 6: shows another example of an embodiment of the rod of FIG. 5, with a front and cross-section side views.

In a first example, the threads 7 have attaching devices 9a and 9a' formed by two loops, having a polygonal cross-section, obtained by molding or die casting the same material forming the threads 7 (FIGS. 3 and 4). Said loops, as shown in FIGS. 5 and 6, engage both with recesses 33 present on the rod 8, acting as a seat for the loops themselves, and with the smooth rod 8 (by keeping anyway the desired position thanks to the next tensioning step).

Figure 20:
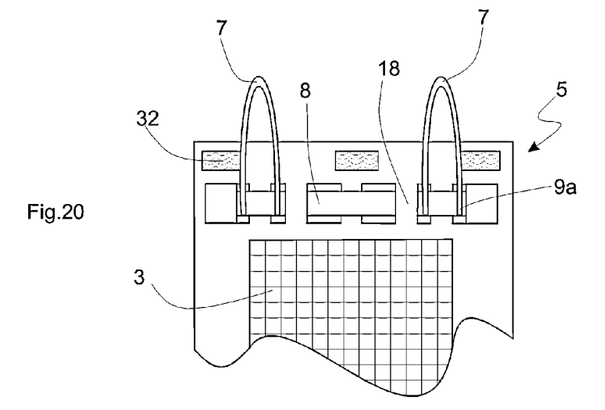
FIGS. 20-23: show a front view of the upper anchoring means in different variants.

Operatively, as it is well shown in FIG. 20, the upper anchoring means 5 comprise two threads 7, whose attaching devices 9a (and 9a') engage a rod 8.

Figure 7:
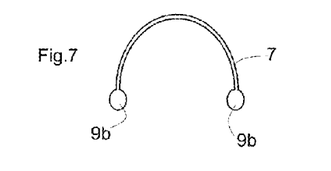
FIG. 7: shows a further example of an embodiment of the threads of the upper anchoring means.
Figure 8:
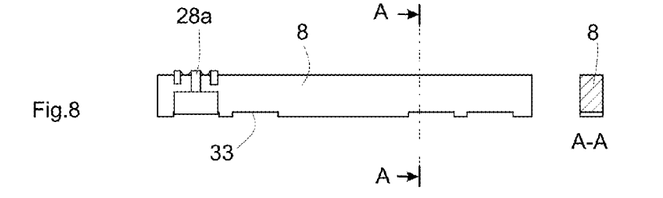
FIGS. 8-9: show a front and cross-section views of two examples of an embodiment of the rod with respect to the hook apparatus.
Figure 9:
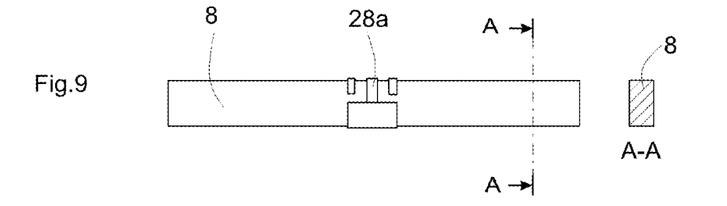

In a second example of an embodiment, the threads 7 have attaching devices 9b formed by bulges having different shapes (FIG. 7), engaging the upper portions of the hooking apparatuses 28a formed by open loops having a polygonal cross-section; said polygonal cross-section open loops locate themselves in slots 33 made in the rod 8, as shown in FIG. 8, or in the smooth rod 8 (FIG. 9).

Figure 21:
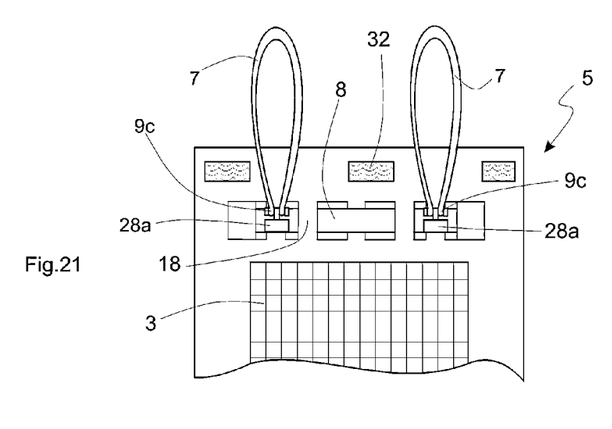

Operatively, as shown in FIG. 21, the upper anchoring means 5 comprise two threads 7, whose attaching devices 9b engage the hooking apparatuses 28a of a rod 8.

A third example of an embodiment provides that the devices 9b for attaching the threads 7 engage grooves 23 made in the side of the rod 8 facing the band 3.

Figures 10, 10A:
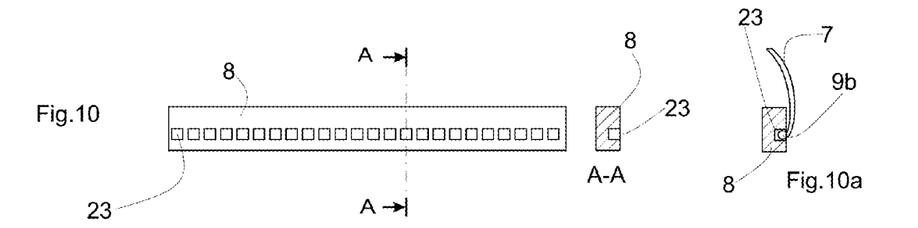
FIG. 10: shows a front and cross-section views of a further rod.
FIG. 10a: shows an example of use of the device of FIG. 10.

Operatively, as shown in FIG. 10a, the attaching devices 9b, formed by bulges, engage in said grooves 23.

Figure 11:
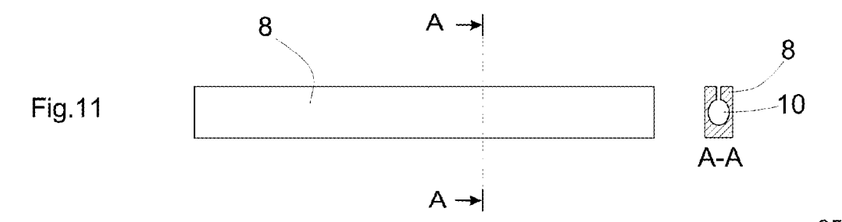
FIG. 11: shows a front and cross-section view of another example of an embodiment of the rod 8.

A fourth example of an embodiment provides that the devices 9b for attaching the threads 7 engage a guide 10 made in the rod 8 itself, having a shape adapted to receive the devices 9b (FIG. 11).

Figure 12:
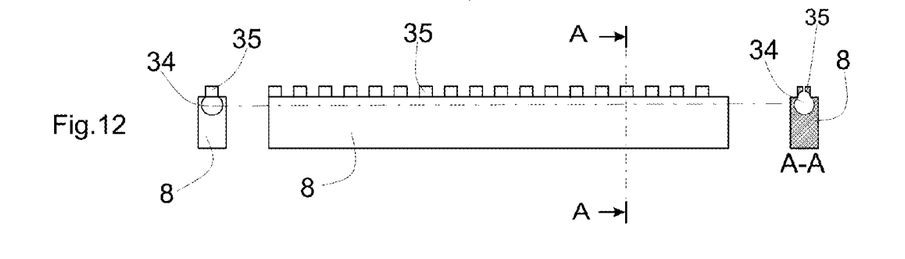
FIG. 12: shows a side front cross-section vies of a further rod 8.

In a fifth example (FIG. 12), the devices 9b for attaching the threads 7 engage a guide 34 directly made in the rod 8 having projections 35; said projections 35 receiving a portion of said guide 34.

Figure 13:
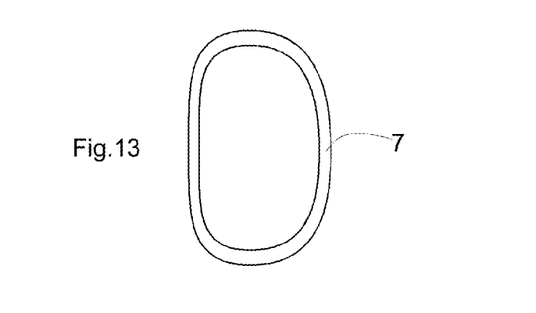
FIG. 13: shows a thread having a loop configuration.
Figure 14:
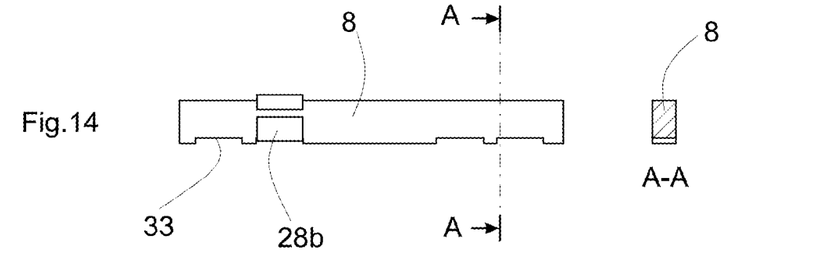
FIGS. 14-16: show a front and a side cross-section views of other examples of an embodiment of the rod with the relevant hook apparatuses.
Figure 15:
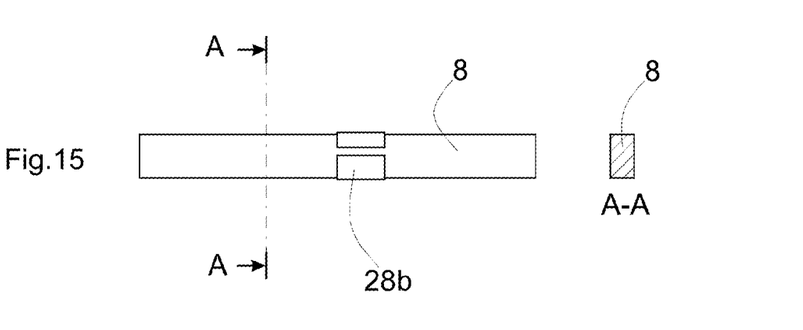
Figure 16:
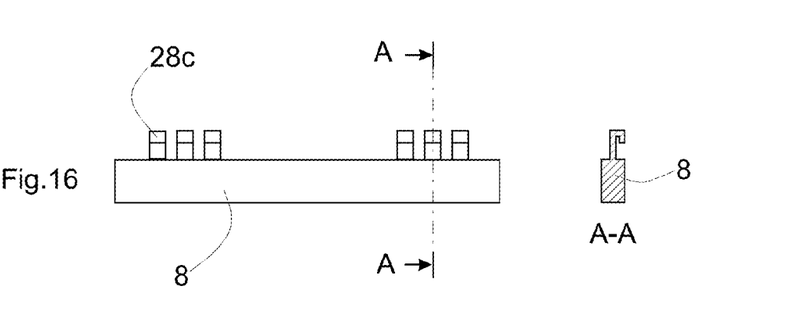
Figure 22:
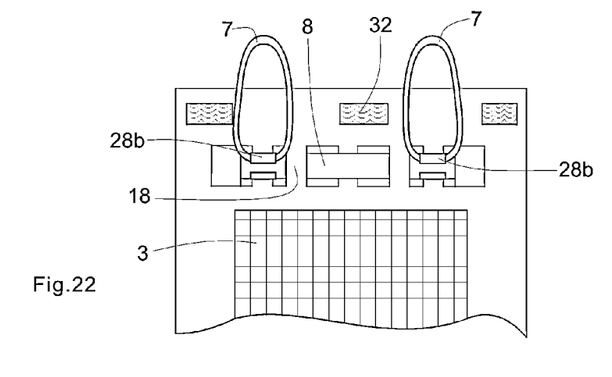

A sixth example comprises said threads 7 having a substantially loop shape (FIG. 13) engaging the upper portion of the hooking apparatuses 28b formed by further polygonal cross-section open loops. In this case, as shown in FIG. 22, the upper anchoring means 5 comprise two threads 7 directly engaging the rod 8 hooking apparatuses 28b.

Figure 23:
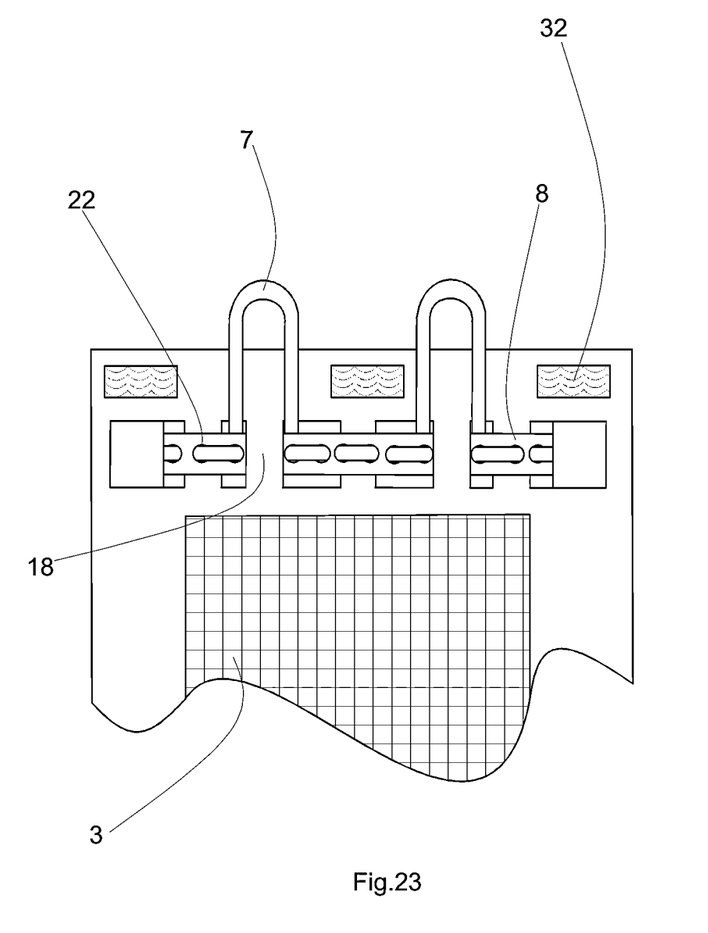
Figure 24:
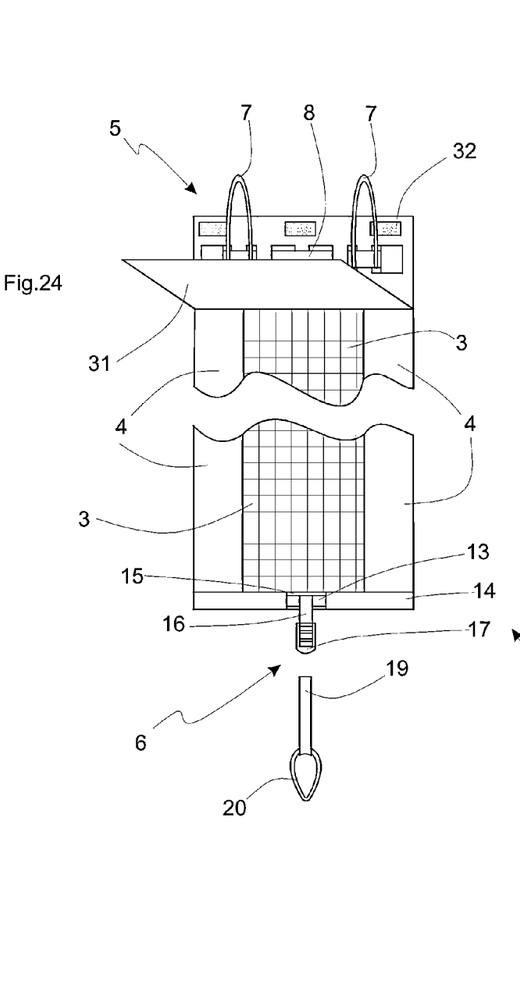
FIGS. 24-27: show the device in different examples of an embodiment.
Figure 25:
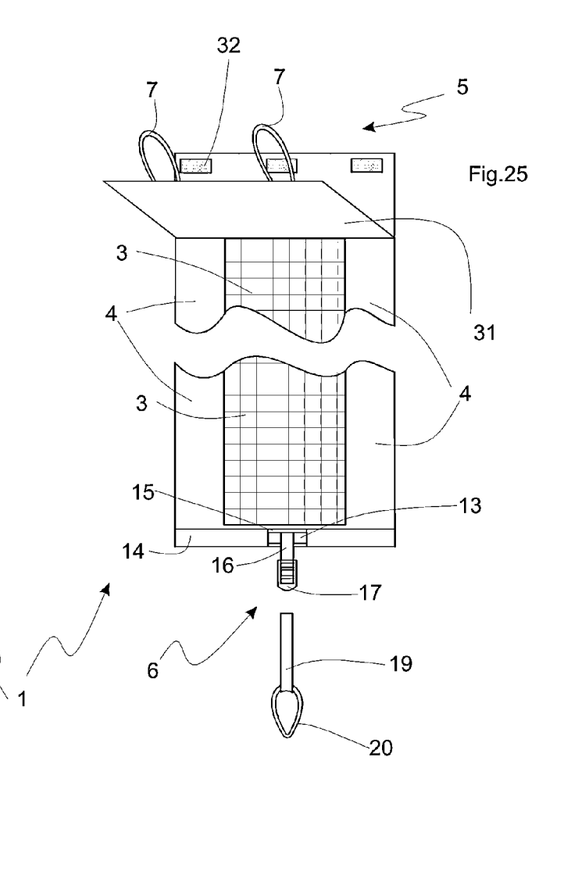
Figure 26:
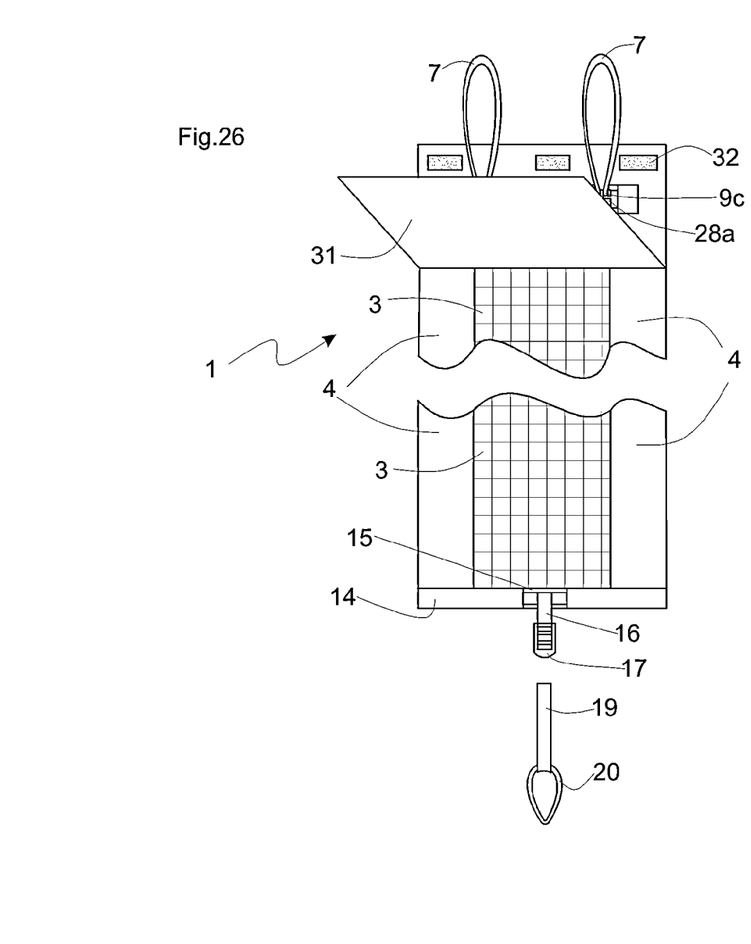
Figure 27:
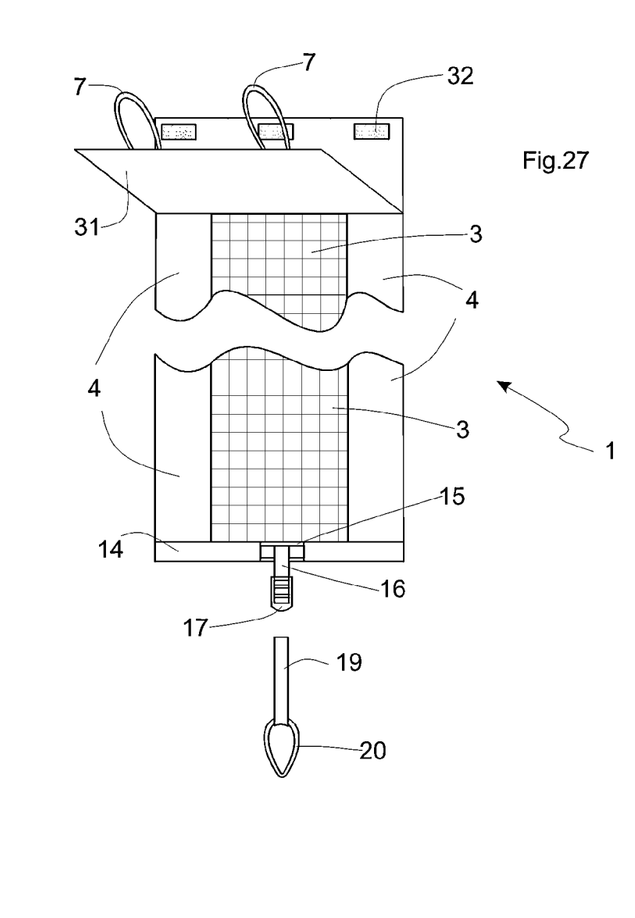
Figure 28:
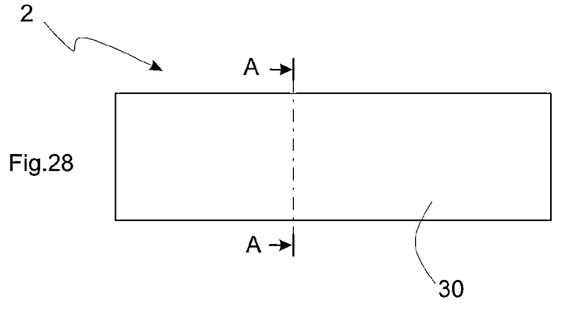
FIG. 28: shows a front view of a cushion without adhering systems.
Figure 29:
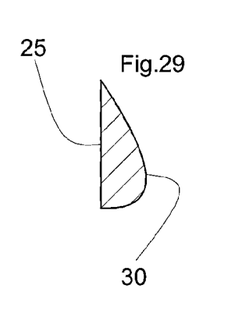
FIG. 29: shows the A-A cross-section of FIG. 25.
Figure 30:
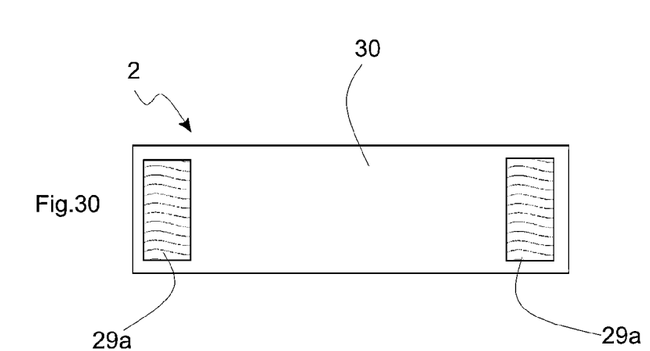
FIGS. 30 and 31: show two front views of the cushion with two different adhering systems.
Figure 31:
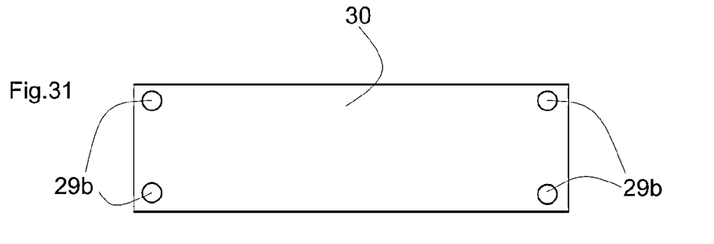

A further example is shown in FIG. 23. As also shown in FIGS. 17 and 18, the rod 8 has through holes 22 receiving alternatively in front and in the back, the thread 7 having the attaching device 9c.

Figure 17:
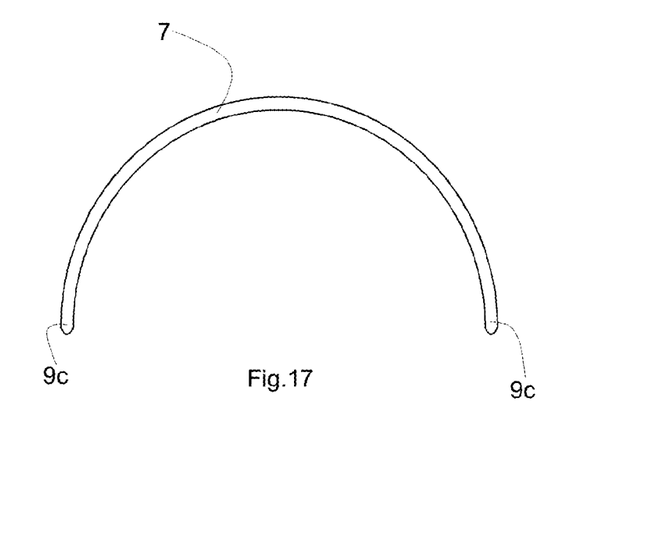
Figure 18:
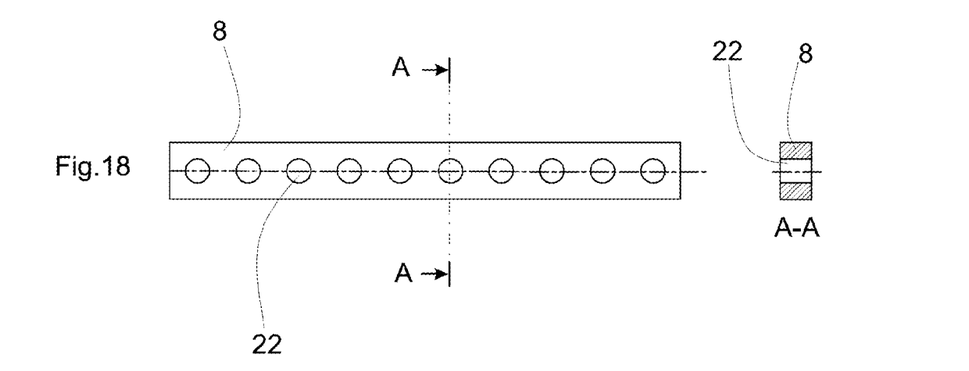
Figure 19:
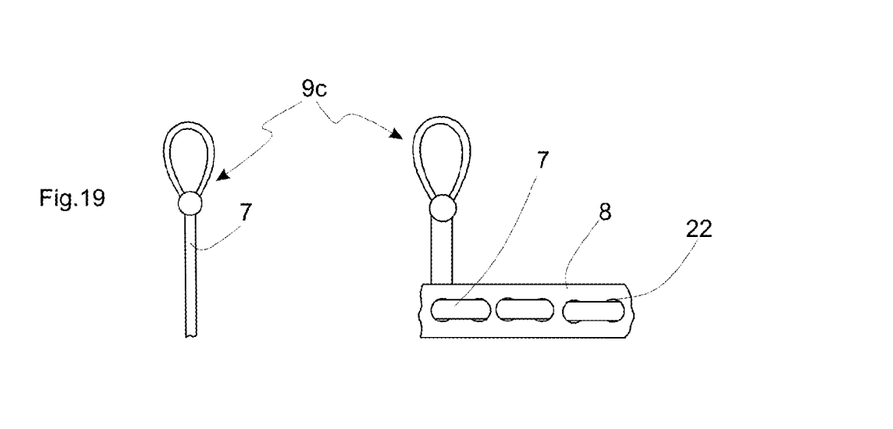

Lastly, FIG. 19 shows the thread 7 of FIG. 17, and the relevant rod 8 in which is engaged said thread, knotted at the two ends in order to form two knots to be attached to the support bars 11 of the headrest 12 of the seats 100. Said approach can comprise knot covering devices adapted to improve the outer appearance of the thread 7.

Said upper anchoring means 5 are located in the upper portion of the strip 1 in an opening obtained by applying a fabric strap on the side under the band 3.

Particularly, the rod 8 alternatively engages frontally and backwardly a plurality of loops 18 obtained by die-cutting or thermo-welding the band 3 itself or applied by stitching.

This particular approach, wherein the rod 8 alternatively engages frontally and backwardly the loops 18, has been designed for obtaining a greater stability of the rod 8 itself.

An approach alternative to the plurality of loops 18 present in the band 3, is given by a open-work sheath having at least two holes for receiving the threads 7 in predetermined positions based on the type of upper anchoring means 5 applied among the above mentioned ones.

The lower anchoring means 6 comprise:
- a pipe 13, and
- a tape 16, for example made of Cordura (a trademark of INVISTA TECHNOLOGIES S.r.l.), having a hook (for example, a fast-release buckle).

The lower portion of the strip 1 has at least one pocket 14 receiving the pipe 13.

Particularly, it is to be noted that the device can comprise more pockets 14 (not shown in figures), located at different heights one from the other, which enable the user to select which of them will receive the pipe 13 as a function of the base of the seats 100.

Obviously, said pockets 14 have, on a side, an entrance hole for said pipe 13.

In the shown example, said pocket 14 has centrally a small hole 15 through which the tape 16 having the hook 17 projects, said hook is connected to the free end of a further tape 19; the latter being partially folded on itself to form a stop for a loop-shaped thread 20 made of a material analogous to the one of the thread 7 fixable to the portion under the base of seats 100.

In another embodiment not shown, the small holes 15 can be in number of two located at the sides of the pipe 13 end, in this embodiment, it is necessary to have two tapes 19 for increasing the tension of the fabric and blocking the cushion which will stay fixed to the seat without any fixing means. In this approach, the pipe 13 will be provided with shouldered rings located at the tapes 16 for preventing the tapes 19 from sliding and for keeping them in a predetermined fixed position.

The strip 1 width is greater than the cushion width so that the upper and lower anchoring means make the strip 1 to perfectly adhere to the seat and block the cushion by keeping it in position.

It is to be observed that, when it is desired to change or remove the seat-cover and/or back-cover strip, said tape 19 with the closed loop thread 20, remains fixed to the portion under the base of seats 100.

After the positioning of said strip 1 on seats 100, said upper and lower anchoring means 5, 6 apply a tensile stress on the strip 1 itself by making it to adhere to the back of seat 100.

As explained before, the strip 1 can comprise a cushion 2, acting as a lumbar and/or spinal support, of different shapes and thicknesses according to the user needs and to the type of seat 100 back.

Figure 1:
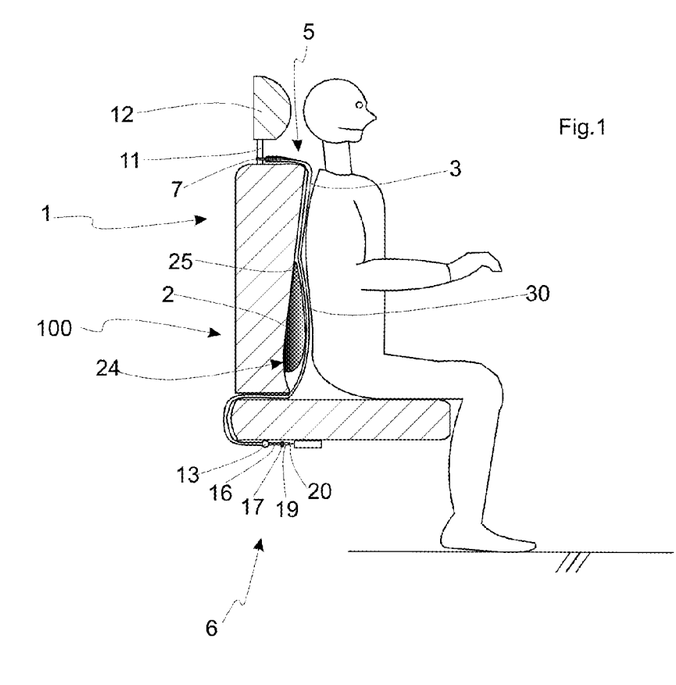
FIG. 1: shows the support fit on a motor-vehicles seat.
Figure 2:
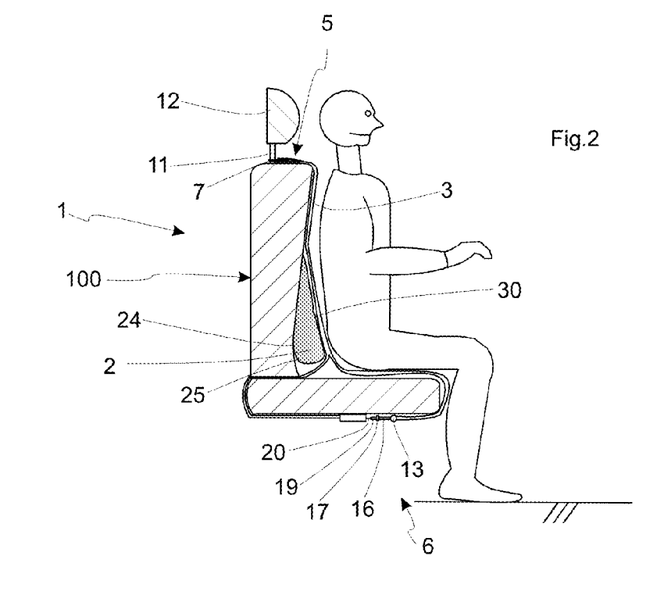
FIG. 2: shows the device of FIG. 1 in another configuration.

In order to obtain a support of the lumbar area of a driver, said cushion 2, covered by a lining made of a fabric similar to the one of band 3, is located under said band 3 between the seat 100 and band 3 and is fixed to band 3 by adhering systems 29a and 29b (provided on the lining) formed, as an example, by portions made of Velcro (trademark of Velcro Industries B.V.) hook and loop fasteners and/or snap fasteners and/or pressure buttons. This system causes the cushion 2 to have a vertically adjustable position, as shown in FIGS. 1 and 2 and to be more stable.

In case the adhering systems 29a are made of portions of Velcro®, it is to be noted that on the strip 1 it is stitched the portion carrying the eyelet, that is the strip made of a hairy fabric with a stiff back which the hair loops project from, while on the front surface 30 of cushion 2 it is stitched the hook, that is the strip of fabric having a stiff back which small flexible hooks project from made of a hard material. This approach provides that the Velcro® portions of the device without cushion 2 do not damage the seat 100 which the strip 1 is applied on.

Figure 40:
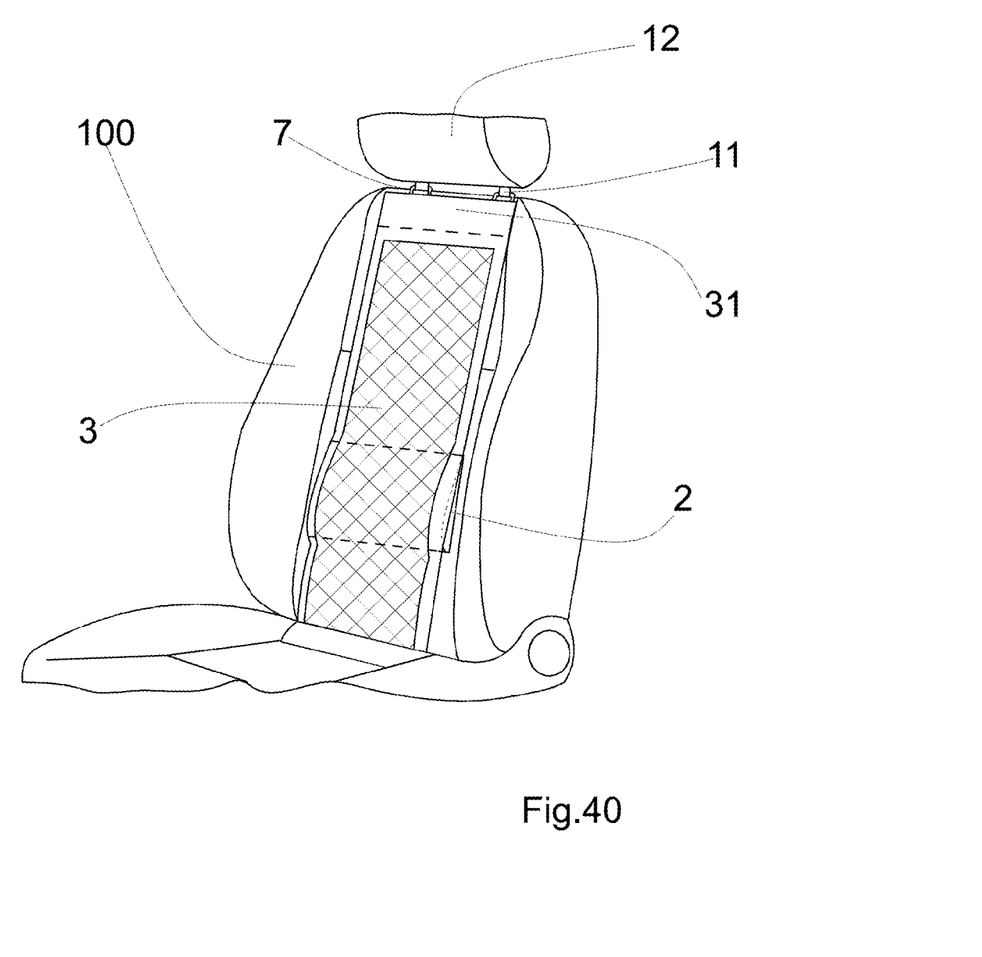
FIG. 40: shows a perspective view of a device applied to a motor-vehicles seat.

The cushion 2, as shown in FIG. 40, remains partially wrapped by the strip 1. The cushion 2 as a rectangular shape and a cross-section which is substantially similar to a "half-drop", in other words gets larger in the vertical direction from the top to the bottom.

The lining, in the side coincident with the flat base 25 of cushion 2, has an anti-slip pattern which makes the device more stable, especially when an user enters the car.

Firstly, this shape enables the cushion 2 to locate itself in a concavity which the majority of seats are provided with, secondly to act as a lumbar/spinal support.

Figure 32:
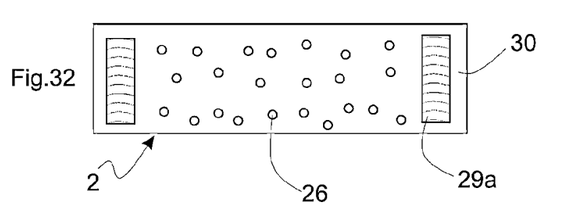
FIG. 32: shows an example of an embodiment of the cushion.
Figure 33:
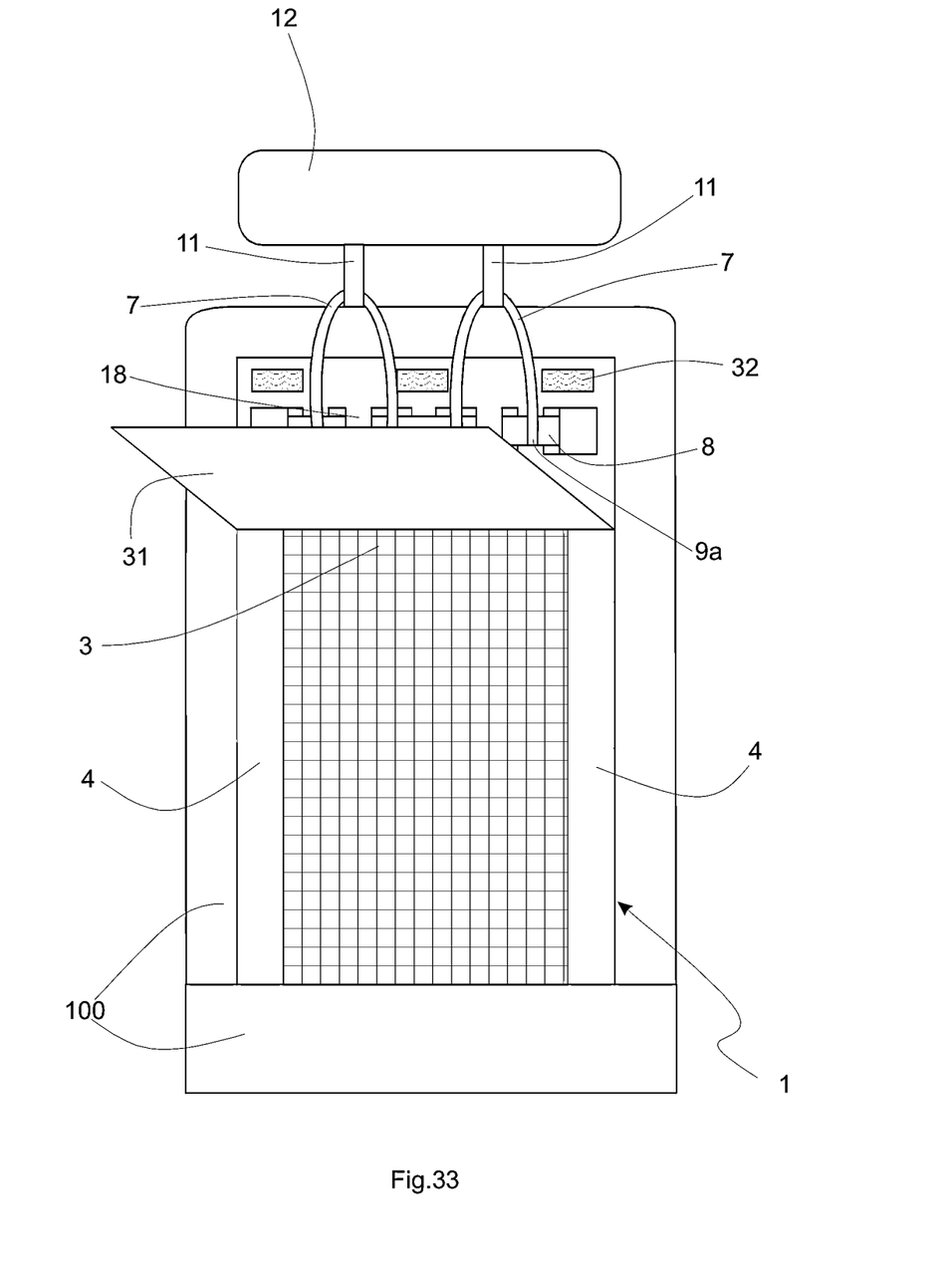
FIG. 33: shows an example of use of the device to a motor-vehicles seat.
Figure 34:
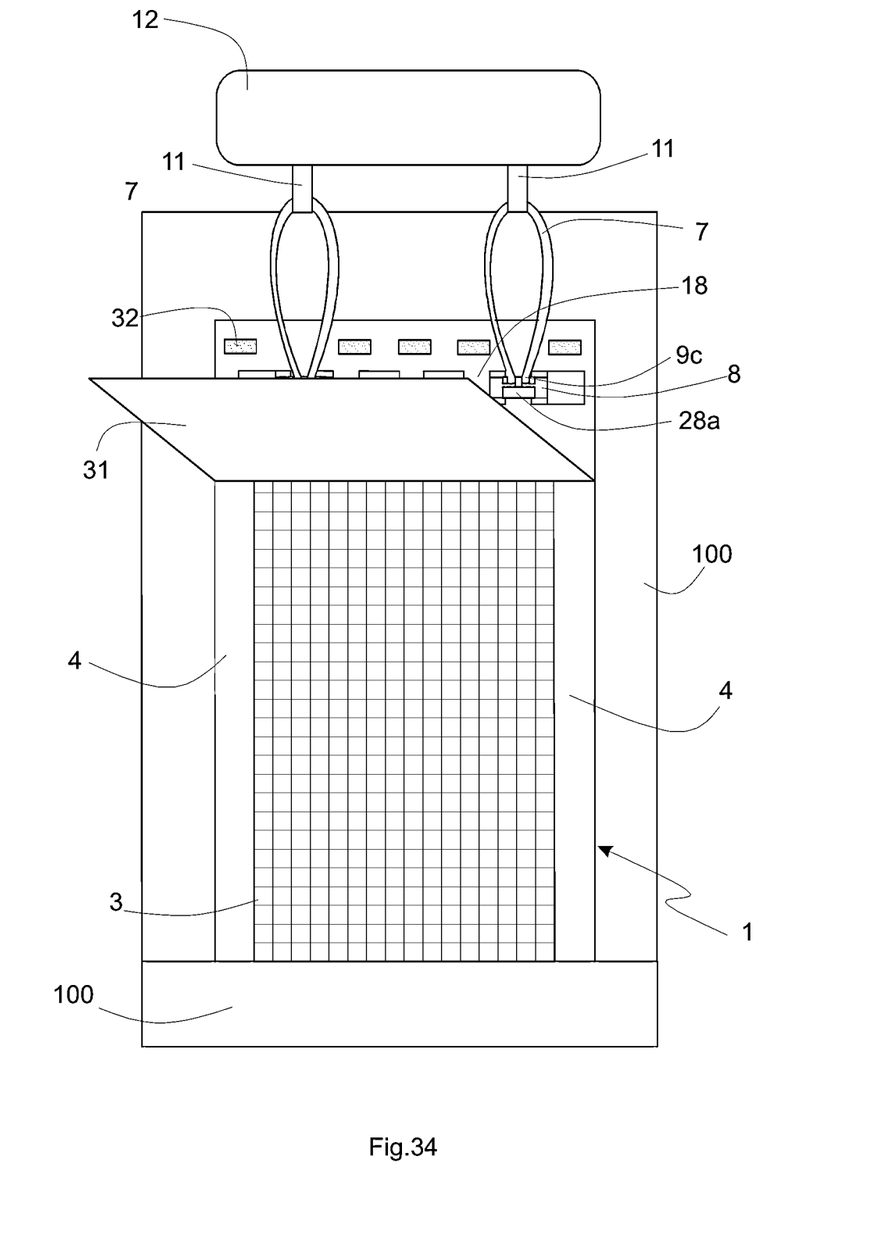
FIG. 34: shows a further example of use of the device to a seat.
Figure 35:
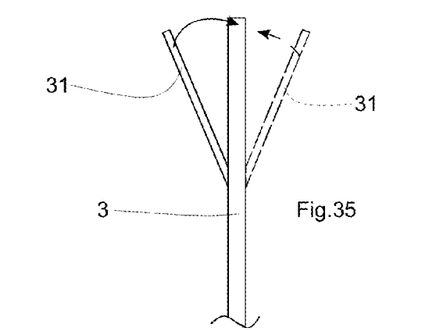
FIG. 35: shows a side view of a detail of the seat-cover or back-cover strip.
Figure 36:
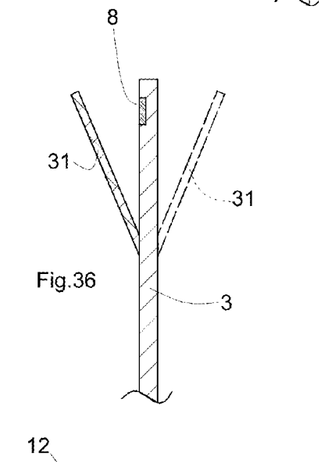
FIGS. 36 and 37: show a cross-section view of two approaches of an embodiment of the detail of FIG. 35.
Figure 37:
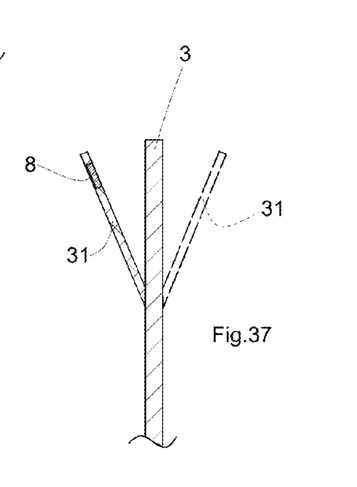
Figure 38:
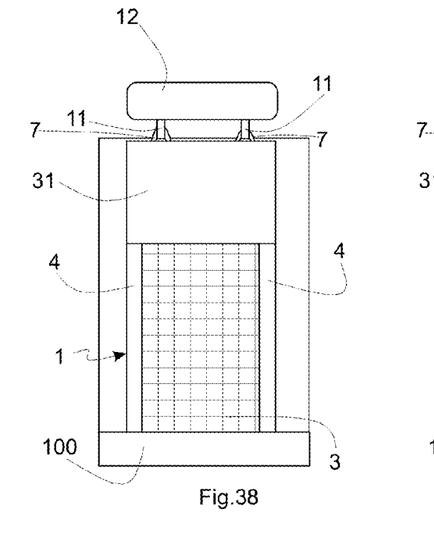
FIGS. 38 and 39: show the strip as a back-cover arranged on a motor-vehicles seat.
Figure 39:
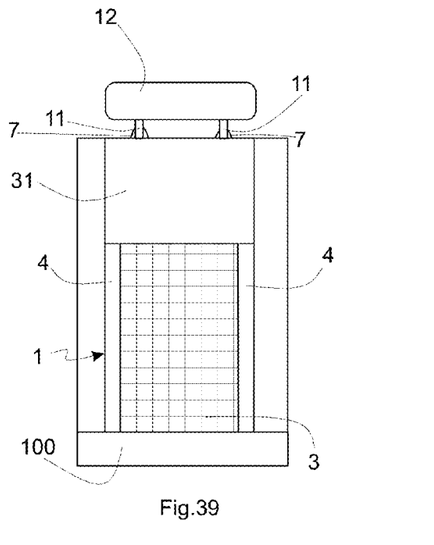

For this last reason, the cushion 2 will be provided or not with a lining and can have different configurations corresponding to different degrees of support. Preferably, the presence of holes 26 in the central area (variant which is not shown in the figures) makes the device softer and ergonomic. For the same reason, a further arrangement provides said holes 26 on the portion of the front surface 30 of the cushion 2 which is not contacted by the area of the lining having the portions made of Velcro® (FIG. 32).

The presence of said holes 26 has also the object of increasing the ventilation between the back of the user and the seat 100 back, by avoiding an excessive heat sensation and consequently an excessive sweating.

The upper and lower anchoring means 5, 6, by applying a tensile stress on the strip 1 under which the cushion 2 is located, cause a slight pressure on cushion 2 and consequently a greater stability of the system.

The upper anchoring means 5, and consequently the loops 18 which receive the rod 8 (or the open-work sheath in the further cited approach), are covered by a flap 31 (made of a fabric strip) frontally or backwardly fixable to the upper portion of the strip 1.

Alternatively, it is possible to provide the loops (or the open-work sheath) and consequently the upper anchoring means 5, on the inner side of said flap 31, rather than on the upper portion of band 3, as shown in figures.

Particularly, if the loops 18 are formed on the flap 31 by die-cutting or thermo-welding, at said loops 18 on the front side of the flap 31 itself it is stitched a further strip of fabric adapted to hide the loops 18.

Said flap 31, in both the configurations, has two main functions: first of all it protects the upper area of strip 1 against wear, in case it is frontally located, and the upper area of the seat 100 back in case is backwardly positioned; secondly, it improves the appearance because it completely hides the upper anchoring means 5.

In both cases, said flap 31 is adherent to the strip 1 by closure devices 32, such as for example portions of Velcro (trademark of Velcro Industries B.V.), and/or snap fasteners and/or pressure buttons.

It is to be noted that in case that flap 31 is backwardly fixed to the upper portion of strip 1, it can be made with a fabric different from the one forming the strip 1, but it can be, for example, made of leather, synthetic leather, alcantara, plastics or non-woven fabrics.

Operatively, as shown in figures, cushion 2 is located on the seat 100 back.

Afterwards, after having located the threads 7 around the support bars 11 of the headrest 12 of seat 100, the cushion 2 is covered by band 3, which by the adhering systems 29a and/or 29b present on the front surface 30 of the cushion 2 lining, adheres to the same.

At this point, it is applied a tensile stress on the devices by hooking the lower anchoring means 6 to the portion under the base of seat 100.

The invention claimed is:

1. Seat-cover or back-cover strip (1) for seats (100) of motor-vehicles, comprising:
 a band (3) made of an elastic fabric;
 upper anchoring means (5) comprising one or more threads (7) for fixing the strip (1) to support bars (11) of a headrest (12) of a seat (100) of a motor-vehicle, each of the upper anchoring means having attaching devices (9a, 9b, 9c) that engage hooking apparatuses (28a, 28b, 28c) or directly engage at least one removable rod (8) having a polygonal cross-section cooperating with the one or more threads (7) directly or by said hooking apparatuses (28a, 28b, 28c);
 said upper anchoring means (5) being positioned so that the rod (8) engages loops (18) in an upper portion of the band (3), or in an open-work sheath having holes for receiving the threads (7) in predetermined positions as a function of the upper anchoring means (5), and wherein the threads (7) engage around said support bars (11); and lower anchoring means (6) comprising:
- at least one pipe (13) which is inserted in a pocket (14) having at least one small hole (15) through which the at least one pipe projects, and
- at least one tape (16) having at least one hook (17) joinable to an end of a further tape (19), the further tape having a looped thread (20) configured to be fixable to a portion under a base of the seat (100).

2. Seat-cover or back-cover strip (1) for seats (100) of motor-vehicles, according to claim 1, further comprising at least one cushion on a back of the seat (100) between the band (3) and the back and having a width adapted to a width of the strip (1) and having an anti-slip pattern on a lining in a side coincident with a flat base (25) of the at least one cushion (2).

3. Seat-cover or back-cover strip (1) for seats (100) of motor-vehicles, according to claim 2, wherein the width of the strip (1) is greater than the width of the at least one cushion (2).

4. Seat-cover or back-cover strip (1) for seats (100) of motor-vehicles, according to claim 2, wherein, after having positioned said strip (1) on the seat (100), said upper and lower anchoring means (5, 6) apply a tensile stress on the band (3) by causing a pressure on the at least one cushion (2).

5. Seat-cover or back-cover strip (1), according to claim 2, wherein the at least one cushion (2) is provided with a plurality of holes (26) for obtaining different supporting and ventilation degrees.

6. Method for positioning one or more lumbar and/or spinal cushions on seats (100) of motor-vehicles using the seat-cover or back-cover strip (1) of claim 2, comprising stretching the band (3) so that a tensile stress of the strip (1) urges the at least one cushion against the back of the seat.

7. Seat-cover or back-cover strip (1) according to claim 2, further comprising adhering systems (29a and 29b) that fix the at least one cushion under the band (3).

8. Seat-cover or back-cover strip (1), according to claim 1, wherein said rod (8) comprises a plurality of notches (33) adapted to directly receive the hooking apparatuses (28a, 28b) or the attaching devices (9a).

9. Seat-cover or back-cover strip (1), according to claim 1, wherein said threads (7) are loops engaging an upper portion of the hooking apparatuses (28b), formed by polygonal cross-section opened loops.

10. Seat-cover or back-cover strip (1), according to claim 1, wherein said attaching devices (9a) are formed by two loops having a polygonal cross-section, obtained by molding or die casting a same material forming the threads (7), which engage notches (33) in the rod (8), which act as a seat for the loops themselves.

11. Seat-cover or back-cover strip (1), according to claim 1, wherein the rod (8) has through holes (22) alternatively receiving in a front and in a back the one or more threads (7) having the attaching devices (9c); said threads (7) being knotted at two ends in order to form two knots to be fixed to the support bars (11) of the headrest (12) of the seats (100).

12. Seat-cover or back-cover strip (1), according to claim 11, wherein the rod (8) alternatively passes in front of and behind a plurality of loops (18), and consequently the upper anchoring means (5) are located in an inner side of said flap (31).

13. Seat-cover or back-cover strip (1), according to claim 1, further comprising a flap (31) that is fixable to an upper portion of strip (1) and wherein the flap covers the upper anchoring means (5) and the loops (18), or the open-work sheath, through which is inserted the rod (8).

14. Seat-cover or back-cover strip (1), according to claim 1, wherein the band (3) made of an elastic fabric is stretched either in only one direction or stretched in two directions.

* * * * *